(12) United States Patent
Wang et al.

(10) Patent No.: US 11,754,779 B1
(45) Date of Patent: Sep. 12, 2023

(54) ELECTRONIC DEVICES WITH COHERENT FIBER BUNDLES

(71) Applicant: Apple Inc., Cupertino, CA (US)

(72) Inventors: Ying-Da Wang, Taipei (TW); Chih-Yao Chang, Taipei (TW); Chun-Chih Chang, Taichung (TW); Nathan K. Gupta, San Francisco, CA (US); Wei Lin, Santa Clara, CA (US); Xiani Li, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/376,460

(22) Filed: Jul. 15, 2021

Related U.S. Application Data

(60) Provisional application No. 63/059,075, filed on Jul. 30, 2020.

(51) Int. Cl.
*G02B 6/06* (2006.01)

(52) U.S. Cl.
CPC ...................... *G02B 6/06* (2013.01)

(58) Field of Classification Search
CPC ...................................................... G02B 6/06
See application file for complete search history.

(56) References Cited

U.S. PATENT DOCUMENTS

| | | | | |
|---|---|---|---|---|
| 5,465,315 A | * | 11/1995 | Sakai | G09F 9/305 385/116 |
| 7,145,611 B2 | | 12/2006 | Dubin et al. | |
| 8,907,863 B2 | * | 12/2014 | Li | H04N 9/12 345/1.1 |
| 9,123,266 B2 | | 9/2015 | Bastani et al. | |
| 9,274,369 B1 | * | 3/2016 | Lee | G02B 6/0005 |
| 10,114,163 B1 | * | 10/2018 | Lu | G02B 6/08 |
| 10,564,914 B2 | * | 2/2020 | Chin | G02F 1/1345 |
| 10,620,365 B2 | | 4/2020 | Dawson | |
| 10,638,619 B2 | * | 4/2020 | Seo | G06F 1/16 |
| 11,067,745 B1 | * | 7/2021 | Wu | G02B 6/0078 |
| 11,092,835 B2 | * | 8/2021 | Asamizu | G02F 1/133615 |
| 11,181,749 B2 | * | 11/2021 | Karafin | G02B 3/0056 |
| 11,435,520 B1 | * | 9/2022 | de Jong | G02B 1/14 |
| 2005/0243415 A1 | | 11/2005 | Lowe et al. | |
| 2014/0037257 A1 | | 2/2014 | Yang et al. | |
| 2016/0266672 A1 | | 9/2016 | Inagaki et al. | |
| 2018/0128973 A1 | | 5/2018 | Powell et al. | |

* cited by examiner

*Primary Examiner* — Daniel Petkovsek
(74) *Attorney, Agent, or Firm* — Treyz Law Group, P.C.; G. Victor Treyz; Tiany He

(57) ABSTRACT

An electronic device may have a display, a display cover layer, and an image transport layer formed from a coherent fiber bundle. The coherent fiber bundle may have an input surface that receives an image from the display and a corresponding output surface to which the image is provide through the coherent fiber bundle. The coherent fiber bundle may be placed between the display and the display cover layer and mounted to a housing. The coherent fiber bundle may have fiber cores with bends that help conceal the housing from view and make the display appear borderless. A central portion of the coherent fiber bundle may be formed from different materials and/or structures than a surrounding border portion of the layer.

17 Claims, 11 Drawing Sheets

US 11,754,779 B1

ELECTRONIC DEVICES WITH COHERENT FIBER BUNDLES

This application claims the benefit of provisional patent application No. 63/059,075, filed Jul. 30, 2020, which is hereby incorporated by reference herein in its entirety.

FIELD

This relates generally to electronic devices, and, more particularly, to coherent fiber bundles for electronic devices with displays.

BACKGROUND

Electronic devices may have displays. Displays have arrays of pixels for displaying images for a user. To protect sensitive display structures from damage, displays may be provided with display cover layers.

SUMMARY

An electronic device may have a display, a display cover layer, and a coherent fiber bundle. The coherent fiber bundle may be placed between the display and the display cover layer and mounted to a housing. The coherent fiber bundle may have an input surface that receives an image from the display and a corresponding output surface to which the image is transported. The coherent fiber bundle may have fiber cores with bends that help conceal the housing from view and make the display appear borderless.

A central portion of the coherent fiber bundle may have a first set of fibers and a border portion of the coherent fiber bundle that runs around a peripheral edge of the central portion may have a second set of fibers. One or more of the properties of the central and border portions may differ. For example, different materials and/or fiber dimensions may be used for the central and border portions of the coherent fiber bundle. In this way, the central and border portions may be configured to overcome potentially different challenges. For example, in the border portions, the fibers may be formed from more formable materials and/or may be provided with structures that exhibit better light confinement to accommodate fiber bending, whereas the central portion may be provided with materials and/or structures that enhance transparency. The use of potentially different materials and/or structures in the border and central portions of a coherent fiber bundle may also help enhance manufacturability and/or reduce cost.

DETAILED DESCRIPTION

An electronic device may have a display. The display may have an array of pixels for creating an image. The image may be visible through transparent structures that overlap the array of pixels. These structures may include an image transport layer such as a coherent fiber bundle layer overlapped by a clear display cover layer.

A coherent fiber bundle may be included in an electronic device to help minimize display borders or to otherwise create a desired appearance for a display. The coherent fiber bundle may have an input surface that receives an image from an array of pixels and a corresponding output surface to which the image is transported from the input surface. A layer of glass, polymer, or other clear material may be used to form a display cover layer that protects the output surface. A user viewing the electronic device will view the image from the array of pixels as being located on the output surface.

In configurations in which the input and output surfaces of an image transport layer such as a coherent fiber bundle have different shapes, the image transport layer may be used to warp the image produced by the array of pixels. For example, the shape of the image can be transformed and the effective size of the image can be changed as the image passes through the image transport layer. In some configurations, edge portions of the image can be stretched outwardly to help minimize display borders.

Figure 1:
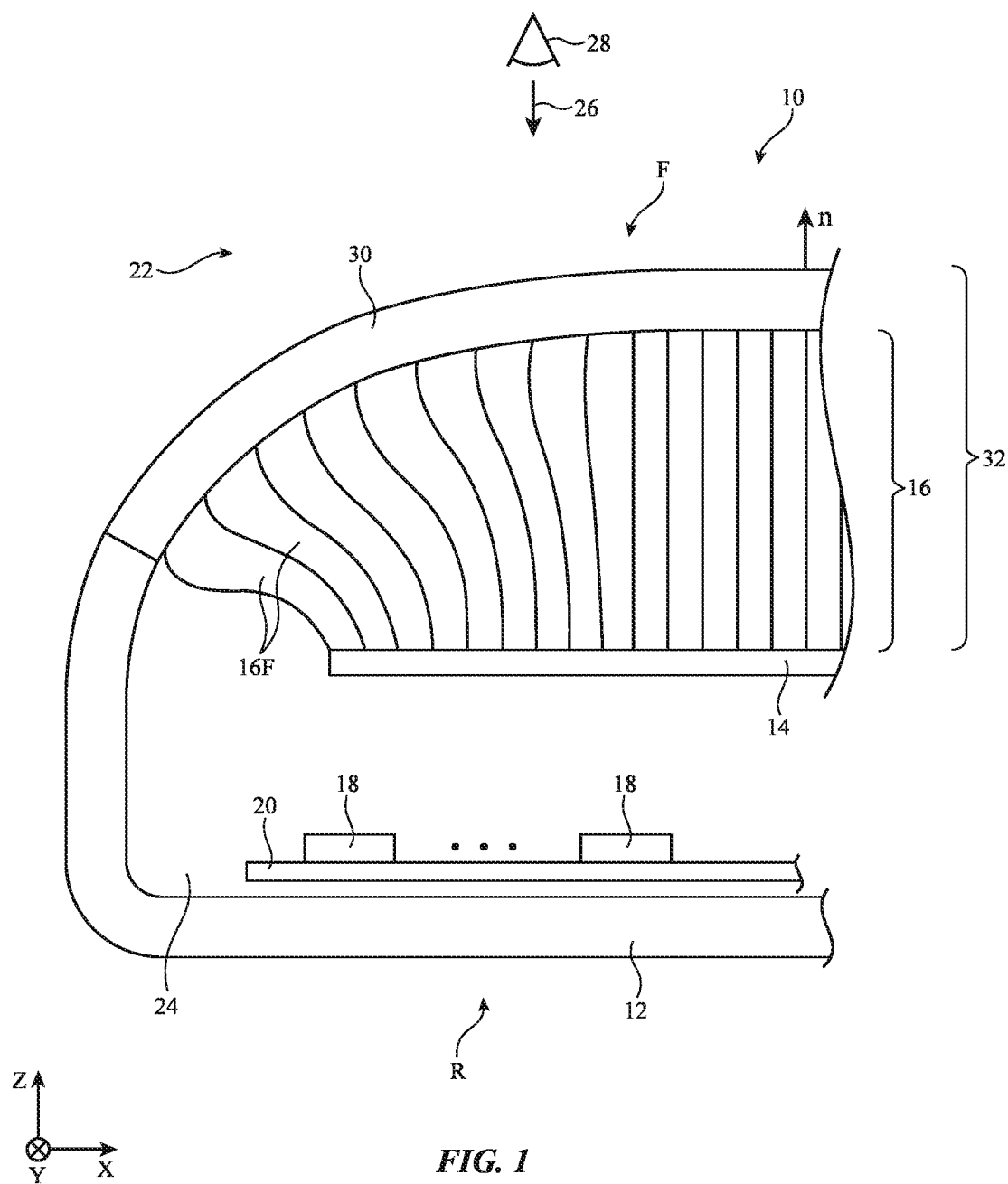
FIG. 1 is a cross-sectional side view of an illustrative electronic device with an image transport layer formed from a coherent fiber bundle in accordance with an embodiment.

A cross-sectional side view of a portion of an illustrative electronic device having a display that includes an image transport layer is shown in FIG. 1. In the example of FIG. 1, device 10 is a portable device such as a cellular telephone, wristwatch, or tablet computer. In general, any type of electronic device may have an image transport layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. For example, housing 12 may have a rear housing wall on rear face R and this rear housing wall may separate interior region 24 from exterior region 22. In some configurations, an opening may be formed in housing 12 for a data port, a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 (e.g., components 18) may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with light-emitting diodes formed from respective crystalline light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer, protective cover layer structures, etc.).

In the example of FIG. 1, display (pixel array) 14 is mounted under protective layer(s) 32. Layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, layer 32 may include image transport layer 16 and display cover layer 30. Display cover layer 30 serves as a protective outer layer for device 10 and display 14. Display cover layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted and layer 16 may serve as a protective display cover layer (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between layer 30 and image transport layer 16 and/or may be included elsewhere in the stack of layers on display 14.

During operation, the pixels of display 14 produce image light that passes through image transport layer 16 (sometimes referred to as an image transfer layer). In configurations in which image transport layer 16 is formed from a coherent fiber bundle, image transport layer 16 has optical fibers 16F. The fibers or other optical structures of image transport layer structures such as image transport layer 16 transport (transfer) light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Image transport layer 16 may therefore move the location of an image and may optionally change the shape of the surface on which the image is presented. In effect, viewer 28 will view the image from display 14 as if the image were generated on the output surface of image transport layer 16. In arrangements in which the image from display 14 is warped (geometrically distorted) by image transport layer 16, digital pre-distortion techniques or other compensation techniques may be used to ensure that the final image viewed on the output surface of image transport layer 16 has a desired appearance. For example, the image on display 14 may be prewarped so that this prewarped image is warped by an equal and opposite amount upon passing through layer 16. In this way, the prewarped image is effectively unwarped by passage through layer 16 will not appear distorted on the output surface.

In configurations of the type shown in FIG. 1, device 10 may have four peripheral edges and a rectangular footprint when viewed in direction 26 or may have other suitable shapes (e.g., a circular outline when viewed in direction 26). To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (e.g., the bends in fibers 16F along their lengths) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portion of the displayed image laterally outward in the X-Y plane along the edges and corners of device 10 to block the edges of device 10 (e.g., the periphery of housing 12) from view. This helps make the display of device 10 appear borderless to viewer 28. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
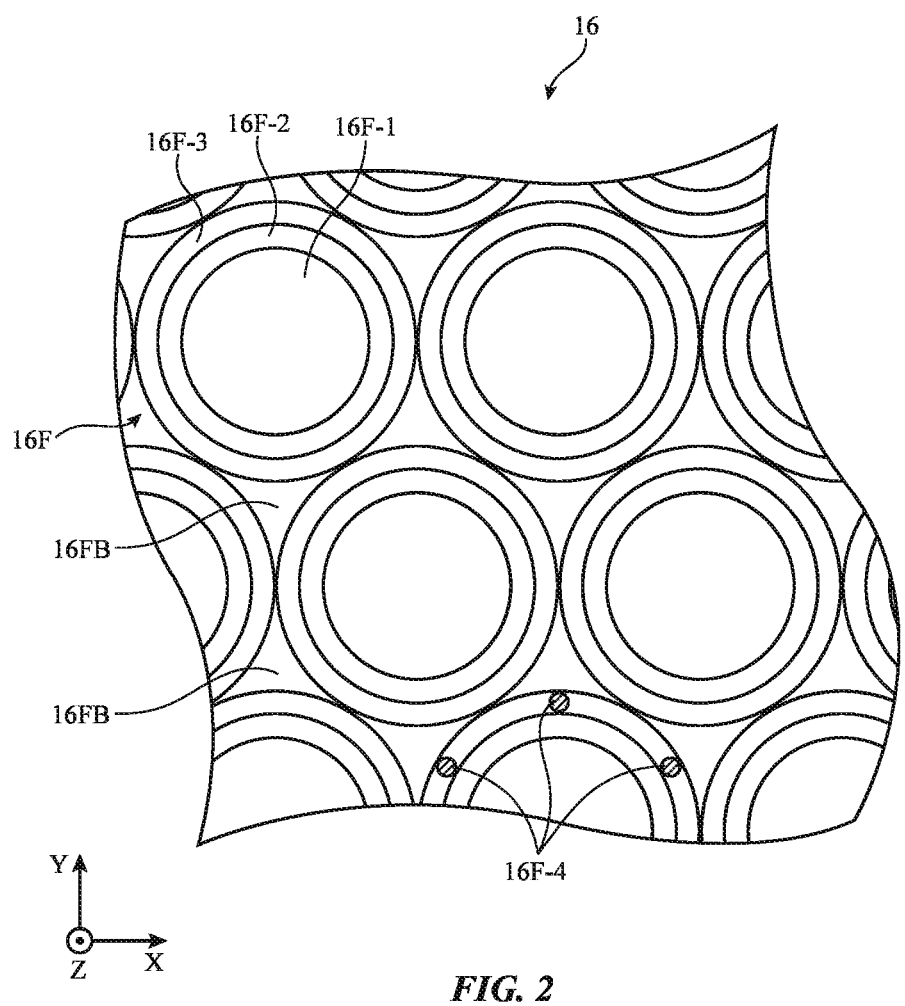
FIG. 2 is a cross-sectional view of a portion of an illustrative image transport layer formed using a coherent fiber bundle in accordance with an embodiment.

FIG. 2 is a cross-sectional view of a portion of image transport layer 16 in an illustrative configuration in which image transport layer 16 is formed from a coherent fiber bundle. Fibers 16F for layer 16 may have any suitable configuration. As shown in the example of FIG. 2, fibers 16F may each have a core such as core 16F-1. Cores 16F-1 and the other structures of image transport layer 16 (e.g., cladding structures, binder, etc.) may be formed from materials such as polymer, glass, crystalline material such as sapphire, and/or other materials. Some or all of these materials may be transparent. Arrangements in which some of the materials absorb light and/or have non-neutral colors or other light filtering properties may also be used.

Fiber cores 16F-1 may be formed from transparent material of a first refractive index and may be surrounded by cladding of a second, lower refractive index to promote light guiding in accordance with the principal of total internal reflection. In some arrangements, a single coating layer on cores 16F-1 may be used to form the cladding. In other arrangements, two or more coating layers on cores 16F-1 may be used to form the cladding. Clad fibers may be held together using binder 16FB, which serves to fill the interstitial spaces between the clad fibers and join fibers 16F together. In some configurations, stray light absorbing material may be incorporated into layer 16 (e.g., into some of the cores, cladding, and/or binder). The stray light absorbing material may be, for example, polymer, glass, or other material into which light-absorbing material such as dye and/or pigment has been incorporated.

In an illustrative configuration, layer 16 may have inner coating layers 16F-2 that are formed directly on the outer surfaces of cores 16F-1 and outer coating layers 16F-3 that are formed directly on the outer surfaces of layers 16F-2. Additional coating layers (e.g., three or more coating layers) or fewer coating layers (e.g., a single coating layer) may be formed on fiber cores 16F-1, if desired. Stray light-absorbing material may be used in layers 16F-2 and/or 16F-3 or other coating layer(s) on cores 16F-1. In an illustrative arrangement, layers 16F-2 and 16F-3, which may sometimes be referred to as forming first and second cladding portions (or first and second claddings) of the claddings for fiber cores 16F-1, may respectively be formed from transparent material and stray light-absorbing material. Other arrangements may be used, if desired (e.g., arrangements in which stray light absorbing material is incorporated into some or all of binder 16FB, arrangements in which cores 16F-1 are formed directly in binder 16FB without any intervening cladding, arrangements in which cores 16F-1 are covered with layers 16F-2 and embedded into binder 16FB without any additional coating layers such as coating layers 16F-3, arrangements in which cores 16F-1 are coated with inner and outer transparent claddings and an interposed intermediate stray-light-absorbing cladding, arrangements in which cores 16F-1 are covered with a single stray-light-absorbing cladding, arrangements in which some or all of fibers 16F are provided with longitudinally extending filaments 16F-4 of stray light absorbing material located, for example, on or in any of the cladding layers, etc.).

In configuration in which fibers 16F have claddings formed from two or more separate cladding layers, the cladding layers may have the same index of refraction or the outermost layers may have lower refractive index values (as examples). Binder 16FB may have a refractive index equal to the refractive index of the cladding material, lower than the refractive index of the cladding material to promote total internal reflection, or higher than the refractive index of the cladding material (as examples). For example, each fiber core 16F-1 may have a first index of refraction and the cladding material surrounding that core may have a second index of refraction that is lower than the first index of refraction by an index difference of at least 0.05, at least 0.1, at least 0.15, at least 10%, at least 20%, less than 50%, less than 30%, or other suitable amount. The binder refractive index may be the same as that of some or all of the cladding material or may be lower (or higher) than the lowest refractive index of the cladding by an index difference of at least 0.05, at least 0.1, at least 0.15, at least 10%, at least 20%, less than 50%, less than 30%, or other suitable amount.

The diameters of cores 16F-1 may be, for example, at least 5 microns, at least 7 microns, at least 8 microns, at least 9 microns, less than 40 microns, less than 17 microns, less than 14 microns, less than 11 microns, or other suitable diameter. Coating layers such as coating layer 16F-2 (e.g. a transparent cladding layer) may have thicknesses of at least 0.1 microns, at least 0.4 microns, less than 2.5 microns, less than 0.8 microns, etc. Fibers 16F (including cores and claddings) may have diameters of at least 6 microns, at least 7 microns, at least 8 microns, at least 9 microns, less than 50 microns, less than 17 microns, less than 14 microns, less than 11 microns, or other suitable diameter.

Fibers 16F may generally extend parallel to each other in image transport layer 16 (e.g., the fibers may run next to each other along the direction of light propagation through the fiber bundle). This allows image light or other light that is presented at the input surface to layer 16 to be conveyed to the output surface of layer 16.

Figure 3:
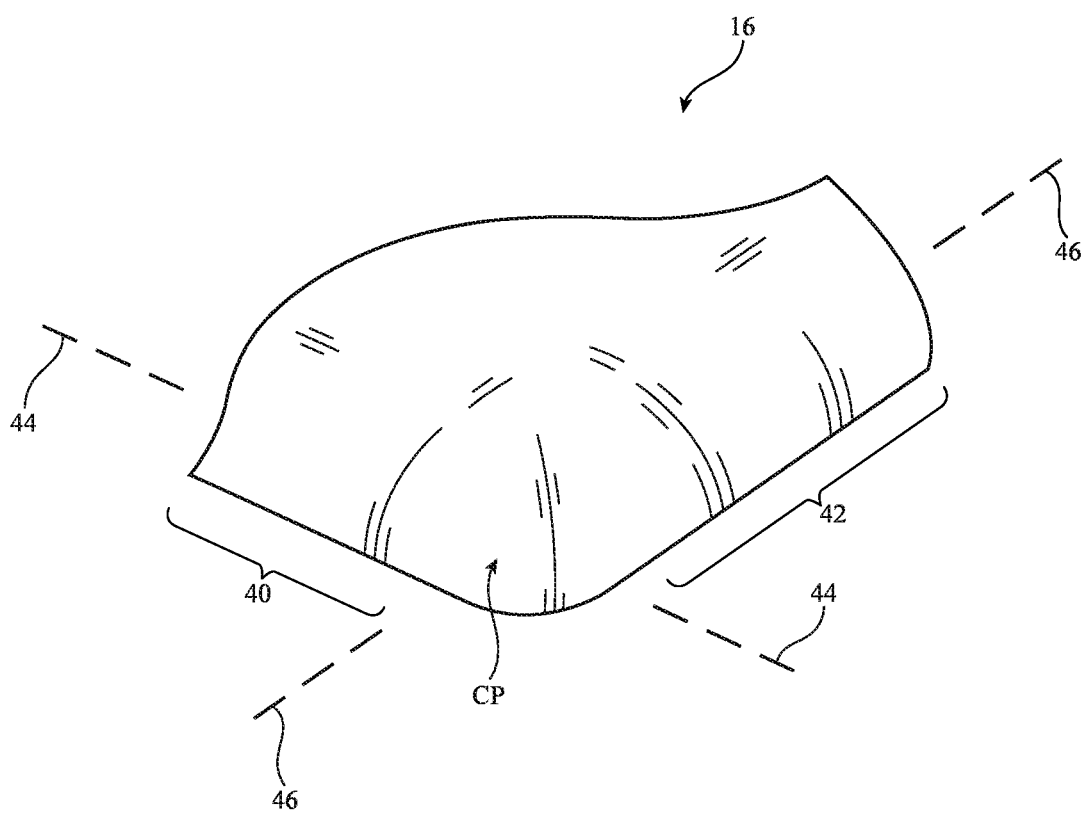
FIG. 3 is a perspective view of a portion of an image transport layer surface with compound curvature in accordance with an embodiment.

Image transport layers can be used to transport an image from a first (input) surface (e.g., the surface of a pixel array) to a second (output) surface (e.g., a surface in device 10 with compound curvature or other curved and/or planar surface shape) while preserving the integrity of the image. A perspective view of an illustrative corner portion of image transport layer 16 is shown in FIG. 3. In the example of FIG. 3, layer 16 has edge portions 40 and 42 with surfaces that curve about axes 44 and 46, respectively. These portions of layer 16 may extend parallel to the straight sides of device 10 (as an example) and are characterized by curved surfaces that can be flattened into a plane without distortion (sometimes referred to as developable surfaces). At the corner of image transport layer 16 of FIG. 3, image transport layer 16 has curved surface portions CP with compound curvature (e.g., a surface that can only be flattened into a plane with distortion, sometimes referred to as a surface with Gaussian curvature). In a rectangular layout with curved corners, image transport layer 16 may have four corners with compound curvature. Image transport layers of other shapes (e.g., circular outlines, etc.) may also have surfaces with compound curvature (e.g., dome-shaped surfaces, an edge surface of compound curvature that runs along the circular periphery of a central circular planar region, etc.). When overlapped by layer 30, the overlapping portions of layer 30 may have corresponding surfaces with compound curvature. When selecting the size and shape of the output surface of layer 16 and therefore the size and shape of the image presented on the output surface, the use of an image transport layer material with compound curvature can provide design flexibility. In general, layer 30 and layer 16 may have planar surfaces and/or surfaces with curved cross-sectional profiles.

Figure 4:
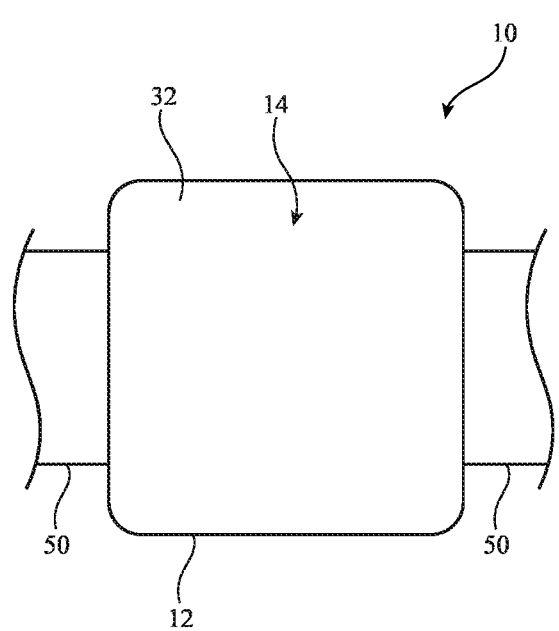
FIG. 4 is a top view of an illustrative electronic device in accordance with an embodiment.

In some arrangements, device 10 may include support structures such as wearable support structures. This allows device 10 to be worn on a body part of a user (e.g., the user's wrist, arm, head, leg, or other portion of the user's body). As an example, device 10 may include a wearable band, such as band 50 of FIG. 4. Band 50, which may sometimes be referred to as a wristband, wrist strap, or wristwatch band, may be formed from polymer, metal, fabric, leather or other natural materials, and/or other material, may have links, may stretch, may be attached to housing 12 in a fixed arrangement, may be detachably coupled to housing 12, may have a single segment or multiple segments joined by a clasp, and/or may have other features that facilitate the wearing of device 10 on a user's wrist.

If desired, image transport layer material may be formed from filaments of material each of which include multiple fiber cores. Filaments may, as an example, be formed using an extrusion process. Subsequent attachment operations (e.g., sheet fusing operations) can create sheets of filaments that are stacked to form blocks of filaments. The blocks of sheet-stacked filaments can be used in forming layer 16 directly or may be drawn in a draw tower or other drawing equipment to reduce their lateral dimensions before being used in forming layer 16.

Figure 5:
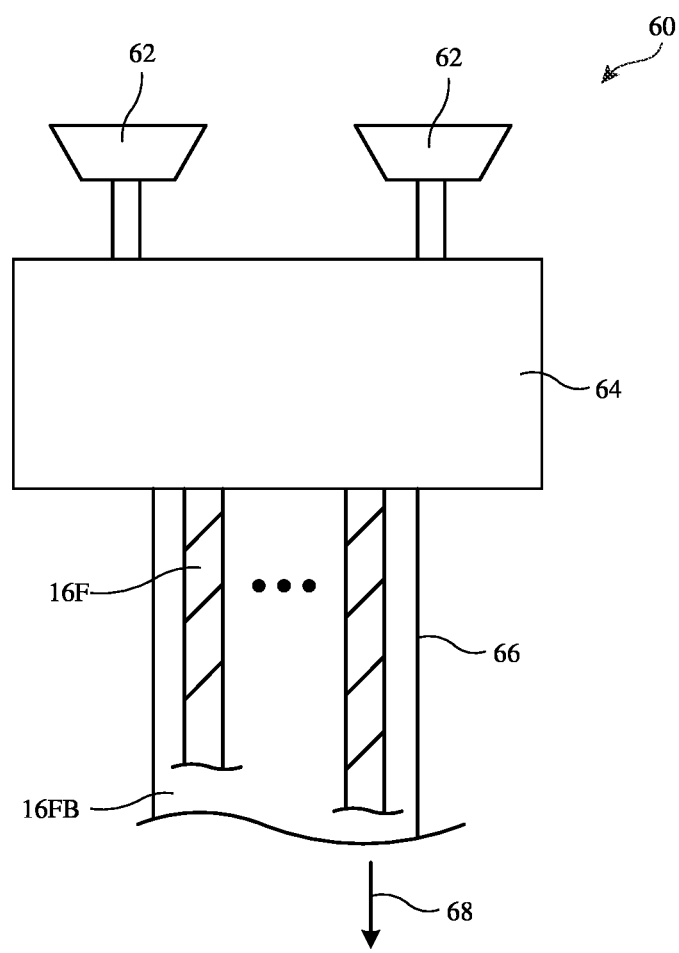
FIG. 5 is a side view of illustrative equipment for forming filaments from elongated strands of binder with embedded fibers in accordance with an embodiment.

An illustrative extrusion tool for forming filaments of image transport layer material is shown in FIG. 5. As shown in FIG. 5, extruder 60 may include hoppers 62 that contain different types of material to be extruded (e.g., different polymers such as binder polymer and fiber core polymer). The material from hoppers 62 may be provided to coextrusion die set 64. During coextrusion, the material from hoppers 62 is coextruded through extrusion die set 64 and forms one or more elongated extruded members such as extruded filament 66, which exits extrusion die set 64 in direction 68. In the example of FIG. 5, filament 66 includes multiple fibers 16F embedded in an elongated strand of binder 16FB (see, e.g., binder 16FB of FIG. 2). Fibers 16F may each have a core 16F-1 covered with a coating layer 16F-2 (e.g., a transparent cladding) as described in connection with FIG. 2 or may be other suitable fibers (e.g., fibers having cores with or without cladding, cores with multiple cladding layers, cores and/or coatings with light-absorbing material and/or transparent material, etc.).

A single filament 66 is being extruded from extrusion die set 64 in FIG. 5. If desired, multiple filaments 66 may be extruded in parallel from die set 64 (e.g., to form bundles of filaments 66 at the output of die set 64). In such configurations, filaments 66 may be debundled prior to subsequent operations (e.g., before fusing or otherwise attaching a layer of filaments 66 together to form a sheet of image transport layer material).

Extrusion die set 64 may include one or more layers with channels configured to distribute fiber core material into multiple cores fibers 16F embedded in binder 16FB during extrusion. Filaments such as filament 66 may have circular cross-sectional shapes and may contain any suitable number of fiber cores and fibers (e.g., at least 3, at least 10, at least 30, at least 100, at least 500, at least 2500, fewer than 20,000, fewer than 4000, fewer than 500, fewer than 100, and/or other suitable number of fiber cores and fibers 16F).

When it is desired to join the filaments produced by extruder 60 (e.g., extruded strands such as multi-core filament 66 of FIG. 5 or other elongated polymer members), the filaments may, as an example, be placed in fusion equipment, which fuses the filaments by applying heat and pressure (e.g., heat and pressure that helps fuse the binder material of the filaments together). In-line fusion tools (e.g., fusers with rollers), laser-fusion equipment, fusion equipment that involves wrapping filaments into channels using computer-controlled equipment that maintains desired angular orientations and tensions computer-controlled, and/or other illustrative fusing tools may be used to fuse filaments together to form image transport layer material.

Figure 6:
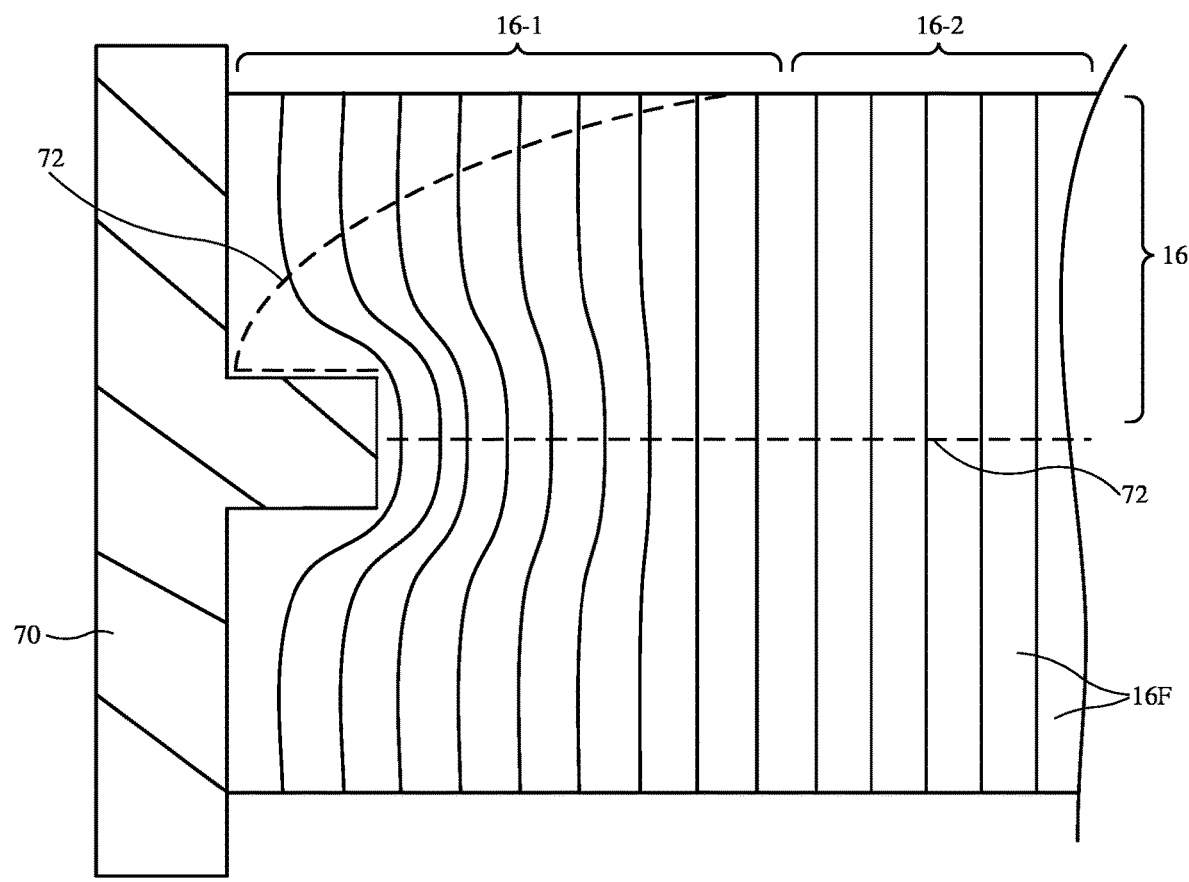
FIG. 6 is a cross-sectional side view of illustrative coherent fiber bundle material in a tool that is forming the material into a desired shape in accordance with an embodiment.

Heat and pressure may be applied to coherent fiber bundle material to deform the material into a desired shape (e.g., during fusion or in a subsequent forming operation performed after initial fusion operations). As shown in FIG. 6, for example, heated die structure such as structure 70 may press against fibers 16F (e.g., fibers 16F in filaments 66 and/or other fibers 16F). This deforms fibers 16F (e.g., to from image transport layer material of the type shown in FIG. 1 to help minimize a display border). Following coherent fiber bundle deformation in a die under heat and pressure, mechanical shaping operations such as cutting, grinding, and polishing operations may be performed to create a desired shape for image transport layer 16. For example, the deformed block of material shown in FIG. 6 may be cut (and/or ground) and polished along dashed line 72 to form layer 16.

Layer 16 may have a main portion such as central portion 16-2 and a border portion such as border portion 16-1. Border portion 16-1 may run along the peripheral edge of central portion 16-2 and may surround central portion 16-2. In central portion 16-2, the input output surfaces of portion 16-2 may be planar or nearly planar. The fibers in portion 16-2 may, if desired, be free of bends. In border portion 16-1, forming operations and subsequent mechanical shaping operations (e.g., cutting, grinding, and polishing) may provide portion 16-1 with curved cross-sectional profiles and deformed fibers 16-1.

If desired, different materials and/or processes may be used in forming central portion 16-2 and border portion 16-1. This allows each portion to be formed from a satisfactory set of material and process conditions, rather than compromising on a single set of materials and processes for forming layer 16. As an example, in central portion 16-2, where good optical quality is desired and where layer 16 may be partly or completely free of bent fibers 16F, a first set of materials may be used in forming fiber cores, cladding material, and binder material, whereas in border portion 16-1, where layer 16 is expected to undergo significant deformation and stress due to fiber bending, a second set of materials may be used in forming fiber cores, cladding material, and binder material. The first set of materials for forming portion 16-2 may have a fiber core material with a lower refractive index than the fiber core material used in the second set of materials for forming portion 16-1. The higher core index in portion 16-1 may strengthen the light guiding properties (e.g., the light confinement ability) of fibers 16F in portion 16-1 relative to fibers 16F in portion 16-2, whereas the materials forming portion 16-2 may enhance the quality of images viewed through portion 16-2. If desired, the materials in portion 16-1 may also be selected to enhance the ability of portion 16-1 to be formed satisfactorily (e.g., using equipment of the type shown in FIG. 6), whereas this consideration may be given less weight or no weight in the selection of the materials for portion 16-2. Because portions 16-1 and 16-2 can be processed separately (if desired), portion 16-1 may, in an illustrative configuration, be subjected to a forming operation, whereas portion 16-2 may not be subjected to this forming operation.

In an illustrative arrangement, in border portion 16-1, the material used in forming cores 16F-1 is optically clear polyester (e.g., polyester with a refractive index of 1.63-1.64), the material used in forming cladding 16-2 is a semicrystalline polymer (e.g., a fluorinated polymer such as THV, which is a terpolymer of tetrafluoroethylene, hexafluoropropylene and vinylidene fluoride), and the material used in forming binder 16FB is acrylic (e.g., polymethyl methacrylate, sometimes referred to as PMMA), whereas in center portion 16M, the material used in forming cores 16F-1 is polystyrene (e.g., polystyrene with a refractive index of 1.56-1.57), the material used in forming cladding 16-2 is a semicrystalline polymer (e.g., a fluorinated polymer such as THV), and the material used in forming binder 16FB is acrylic (e.g., PMMA).

In some configurations, border portion 16-1 may be formed from image transport layer material and a central member that is surrounded by border portion 16-1 may be formed from a solid block of acrylic or other clear material (e.g., a transparent plate of material without any fibers, cladding, etc.). If desired, central portion 16-2 may be a coherent fiber bundle and a surrounding border structure may be formed from a solid clear material (e.g., acrylic, etc.) without any fibers, cladding, etc. In any of these arrangements, the border portion and central portion of these structures may be covered with display cover layer 30 to provide additional protection.

Figure 7:
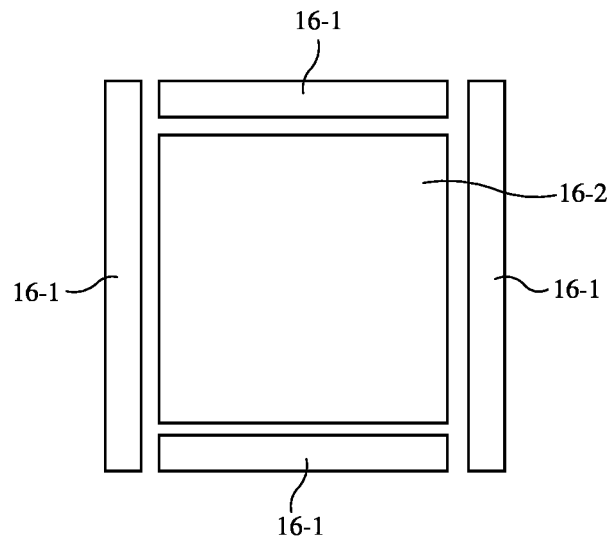
FIG. 7 is a top view of illustrative blocks of image transport material being assembled together to form a central portion and a surrounding border portion in accordance with an embodiment.

Border portion 16-1 and central portion 16-2 may be attached using adhesive (e.g., liquid adhesive that is cured by time, temperature, and/or application of light) and/or by fusion (e.g., joining polymers or other materials in portions 16-1 and 16-2 together under heat and pressure). Border portion 16-1 may be formed in a ring shape that fits around the periphery of central portion 16-2 and/or may be attached to central portion 16-2 by separately attaching a series of elongated strip-shaped border structures as shown in FIG. 7.

Figure 8:
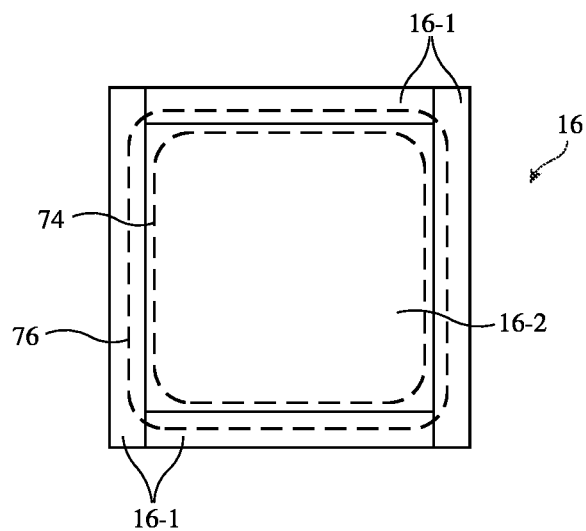
FIG. 8 is a top view of the illustrative blocks of image transport material of FIG. 7 following assembly in accordance with an embodiment.

The bent fibers 16F of layer 16 may be contained only in border portion 16-1 or central portion 16-2 may include some bent fibers. FIG. 8 is a top view of layer 16 following forming to create bends in the fibers. Dashed lines 76 and 74 represent possible outlines for the portion of layer 16 that does not contain bent fibers. When forming occurs near line 74, some of the bent fibers of layer 16 may be located in border portion 16-1 and some of the bend fibers of layer 16 may be located at the edge of central portion 16-2. When forming occurs near line 76, all fiber bending may, if desired, be confined to border portion 16-1.

The materials used in forming portions 16-1 and 16-2, the materials applied to portions 16-1 and 16-2, and/or the fabrication processes applied to portions 16-1 and 16-2 (e.g., forming using heat and pressure, mechanical shaping operations such as cutting, grinding, and polishing, and/or other processing operations), may differ before, during, and/or after portions 16-1 and 16-2 are attached to form layer 16.

To help ensure satisfactory alignment of filaments 66 with respect to each other in image transport layer 16 (e.g., to help ensure that filaments 66 and the fibers in filaments 66 are aligned during fusion), it may be desirable to place a single layer of filaments 66 together to form a filament sheet (sometimes referred to as a coherent fiber bundle sheet, a sheet of filaments, a sheet of image transport layer material, etc.). Multiple sheets can then be stacked and fused to form a coherent fiber bundle in which filaments are packed together with a desired filament alignment and density. Before stacking, sheets of filaments may optionally be partly or completely fused. Coherent fiber bundle material formed from sheets of filaments may sometimes be referred to as sheet-packed coherent fiber bundle material, sheet-packed image transport layer material, sheet-stacked image transport layer material, a sheet-packed coherent fiber bundle, sheet-packed filaments, etc. Following sheet stacking and fusion to form a block of coherent fiber bundle material, the coherent fiber bundle material may optionally be drawn (e.g., along a dimension parallel to fibers 16F) to reduce the lateral dimensions of fibers 16F.

Figure 9:
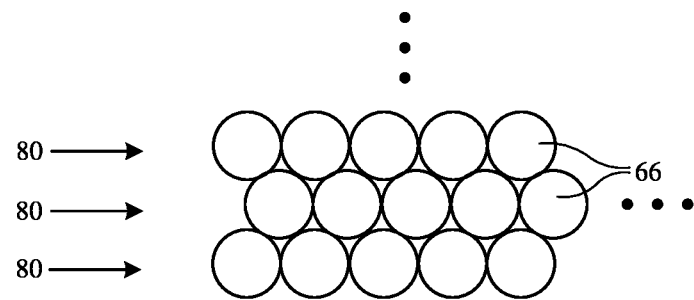
FIG. 9 is a cross-sectional side view of sheet-stacked fiber bundle material in accordance with an embodiment.

FIG. 9 is a cross-sectional side view of coherent fiber bundle material for layer 16 showing how multiple sheets 80 of filaments 66 may be stacked together.

Figure 10:
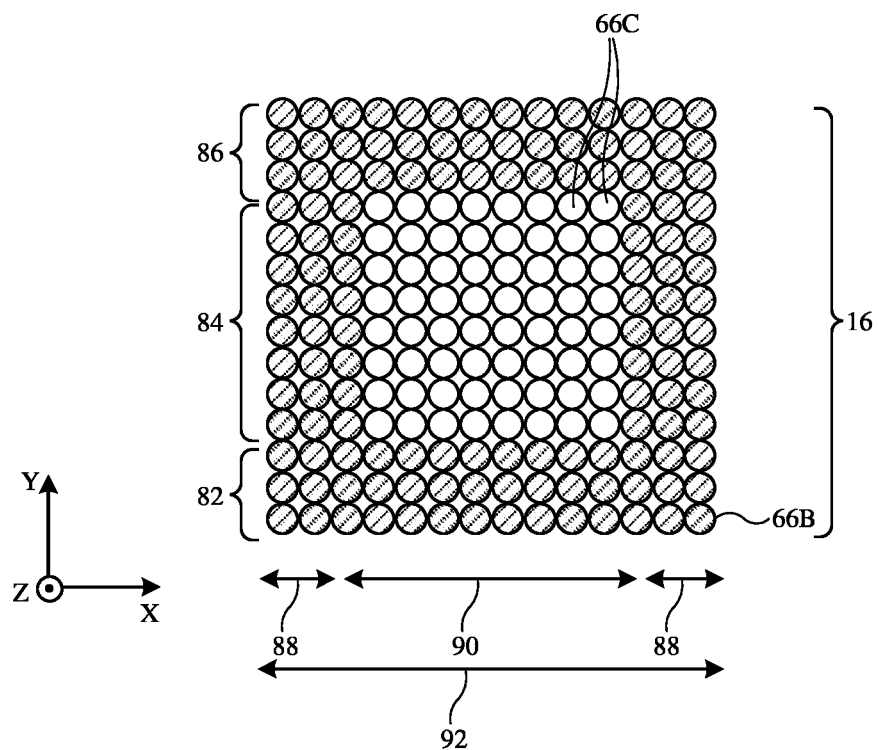
FIG. 10 is a cross-sectional side view of a block of image transport material with different central and border portions formed from sheet-stacked fiber bundle material in accordance with an embodiment.

To form image transport layer material in which border portion 16-1 and central portion 16-2 differ (in materials, processing, etc.), different types of filaments may be sheet stacked and fused as shown in FIG. 10. In the example of FIG. 10, image transport layer 16 has been formed in a square shape having a width 92. Sheets of filaments may be stacked by winding successive sheets of filaments about a roller (as an example) or by stacking sheets of filaments using other equipment. At the bottom of the stack of filaments sheets (e.g., in bottom portion 82), the filaments are all of a first type (filaments 66B). This first filament type has a first type of binder and a first type of fibers (e.g., fibers with a first type of fiber core, a first type of cladding material, etc.). The sheets of filaments 66B extend the full width (width 92) of layer 16. After forming portion 82, additional sheets of filaments for portion 84 may be stacked on top of portion 82. In portion 84, edge portions 88 contain filaments of the first type (filaments 66B) and central portion 90 contains filaments of a second type (filaments 66C) differing from the first type. The second type of filaments may, for example, have a second type of binder and a second type of fibers (e.g., fibers with a second type of fiber core, a second type of fiber cladding, etc.). Any or all of the properties (materials, dimensions, etc.) of the first type of filaments may differ from those of the second type of filaments. After forming portion 84, additional sheets of filaments of the first type (filaments 66C) may be stacked on portion 84 to form portion 86. Fusion operations may be formed on the final assembly of stacked filaments to form a block of image transport layer material.

Figure 11:
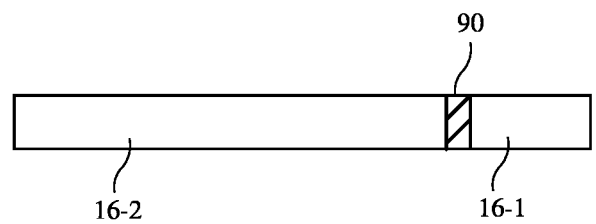
FIG. 11 is a cross-sectional side view of an illustrative image transport layer formed from first and second portions joined by adhesive in accordance with an embodiment.
Figure 12:
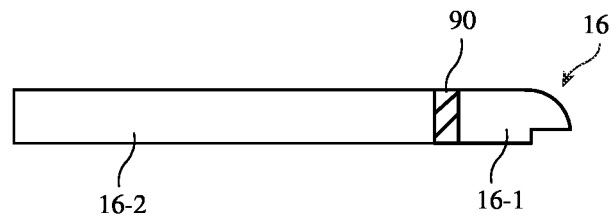
FIG. 12 is a cross-sectional side view of an image transport layer formed from first and second portions joined by adhesive in an illustrative configuration in which at least one of the portions has been formed to deform fibers into a desired shape in accordance with an embodiment.

In the example of FIG. 10, filaments 66C and filaments 66B have been arranged into a desired pattern so that following fusion, an image transport layer is formed with a border portion 16-1 (filaments 66B) that surrounds central portion 16-2 (filaments 66C). Other types of attachment mechanism may be used, if desired. As shown in FIG. 11, for example, portion 16-1 may be attached to portion 16-2 using a layer of adhesive such as adhesive 90. In a first illustrative arrangement, portions 16-1 and 16-2 may be processed after attachment (e.g., to form portion 16-1 into a desired shape with bent fibers by application of heat and pressure, to machine portion 16-1 and/or portion 16-2 into desired shapes such as shapes in which portion 16-1 has an upper surface with a curved cross-sectional profile, etc.). In this first illustrative arrangement, image transport layer 16 may appear as shown in FIG. 12 following processing. If desired, a second illustrative arrangement may be used to form layer 16 of FIG. 12. In this second illustrative arrangement, portions 16-1 and 16-2 are processed separately (e.g., with forming operations and/or mechanical shaping operations, etc.). For example, portion 16-1 may be formed to bend fibers in portion 16-1 and may then be mechanically processed to provide portion 16-1 with an upper surface having a curved cross-sectional profile, whereas portion 16-2 may not be formed and may not be provided with a curved upper surface. After some or all of these separate processing operations, portions 16-1 and 16-2 may be joined using adhesive 90 and the optionally processed further to form image transport layer 16 of FIG. 12.

Figure 13:
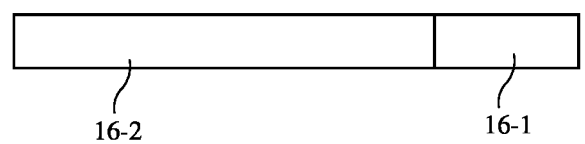
FIG. 13 is a cross-sectional side view of an illustrative image transport layer formed from first and second portions fused together without adhesive in accordance with an embodiment.
Figure 14:
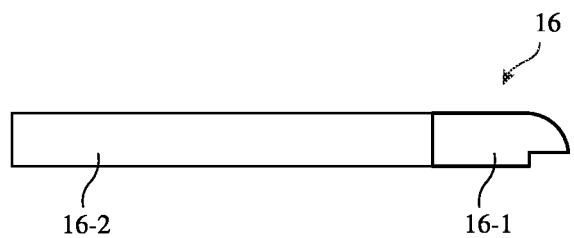
FIG. 14 is a cross-sectional side view of an image transport layer formed from first and second portions fused together without adhesive in an illustrative configuration in which at least one of the portions has been formed to deform fibers into a desired shape in accordance with an embodiment.

If desired, portions 16-1 and 16-2 may be attached using fusion operations rather than adhesive. This type of approach is illustrated in FIGS. 13 and 14. As shown in FIG. 13, for example, portion 16-1 may be attached to portion 16-2 by fusing portions 16-1 and 16-2 together under heat and pressure. Due to the use of fusion, no adhesive layer is present between portions 16-1 and 16-2.

In a first illustrative fusion arrangement, portions 16-1 and 16-2 may be processed after fusion (e.g., to form portion 16-1 into a desired shape with bent fibers by application of heat and pressure, to machine portion 16-1 and/or portion 16-2 into desired shapes such as shapes in which portion 16-1 has an upper surface with a curved cross-sectional profile, etc.). In this first illustrative fusion arrangement, image transport layer 16 may appear as shown in FIG. 14 following processing. If desired, a second illustrative fusion arrangement may be used to form layer 16 of FIG. 14. In this second illustrative arrangement, portions 16-1 and 16-2 are processed separately (e.g., with forming operations and/or mechanical shaping operations, etc.). For example, portion 16-1 may be formed to bend fibers in portion 16-1 and may then be mechanically processed to provide portion 16-1 with an upper surface having a curved cross-sectional profile, whereas portion 16-2 may not be formed. After some or all of these separate processing operations, portions 16-1 and 16-2 may be joined using fusion to form image transport layer 16 of FIG. 14, followed by optional additional processing.

Figure 15:
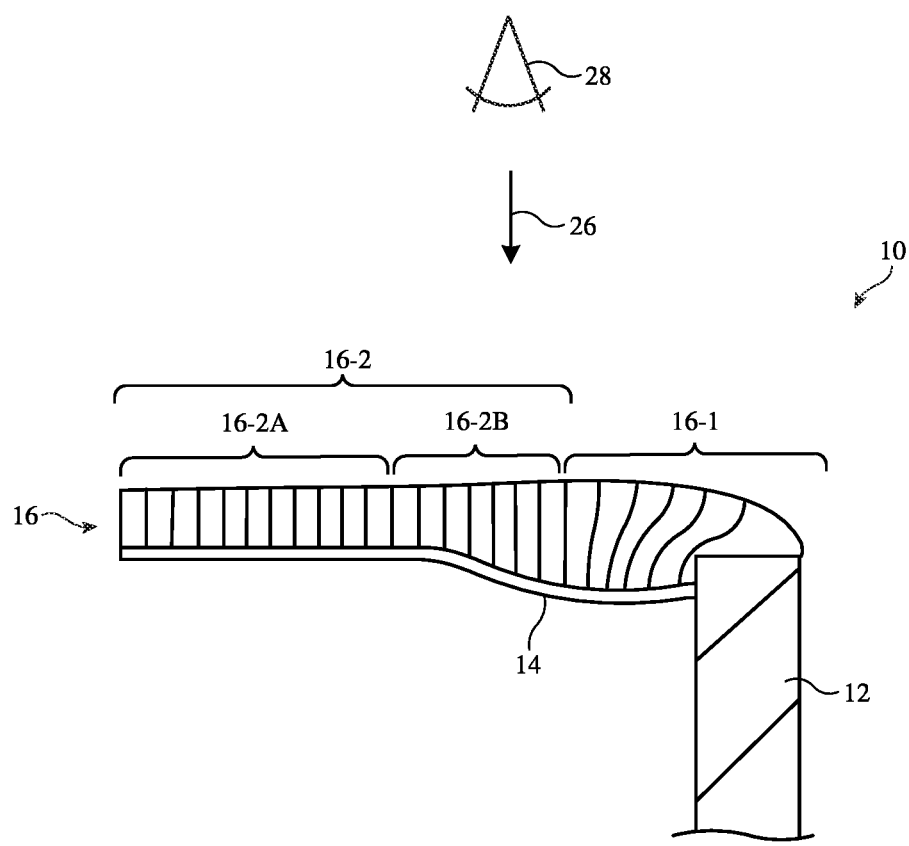
FIG. 15 is a cross-sectional side view of an illustrative electronic device with an image transport layer coupled to a housing in accordance with an embodiment.

FIG. 15 is a cross-sectional side view of device 10 in an illustrative configuration in which portions 16-1 and 16-2 have been joined to form layer 16 and in which layer 16 has been mounted over display 14 and attached to housing 12. In this example, portion 16-1 has bent fibers configured to minimize the visible border of device 10 (e.g., by overlapping some or all of housing 12 so that housing 12 is partly or completely hidden from view by viewer 28). Portion 16-1 has a stepped ledge formed from a recessed portion along the outer edge of its lower surface that is used to help receive housing 12 and thereby join layer 16 to housing 12. Housing 12 may be attached to the ledge of portion 16-1 using a layer of adhesive and/or other attachment structures. An optional display cover layer (e.g., display cover layer 30 of FIG. 1 may overlap image transport layer 16 of FIG. 15 and the other FIGS. Housing 12 may be attached to the display cover layer by a layer of adhesive (e.g., part of the same layer of adhesive that attaches housing 12 to the surface of the stepped ledge in portion 16-1). This type of configuration may be used in devices such as device 10 of FIG. 1 and/or other devices 10.

In the FIG. 15 example, the lower (inwardly facing) surface of portion 16-1 has been provided with a curved cross-sectional profile. Central portion 16-2 includes portion 16-2A and a portion such as portion 16-2B adjacent to border portion 16-1. Portion 16-2A may have a planar inner surface. Portion 16-2B may have an inner surface with a curved cross-sectional profile. The shapes of the inner surfaces of portions 16-1 and 16-2B may be configured to create a smooth (e.g., stepless) transition between portions 16-1 and 16-2B. Display 14 may be a flexible display (e.g., an organic light-emitting diode display or a flexible display having pixels formed from crystalline semiconductor light-emitting diode dies mounted on a flexible substrate). This allows display 14 to bend to conform to the curved inner surface of layer 16.

Figure 16:
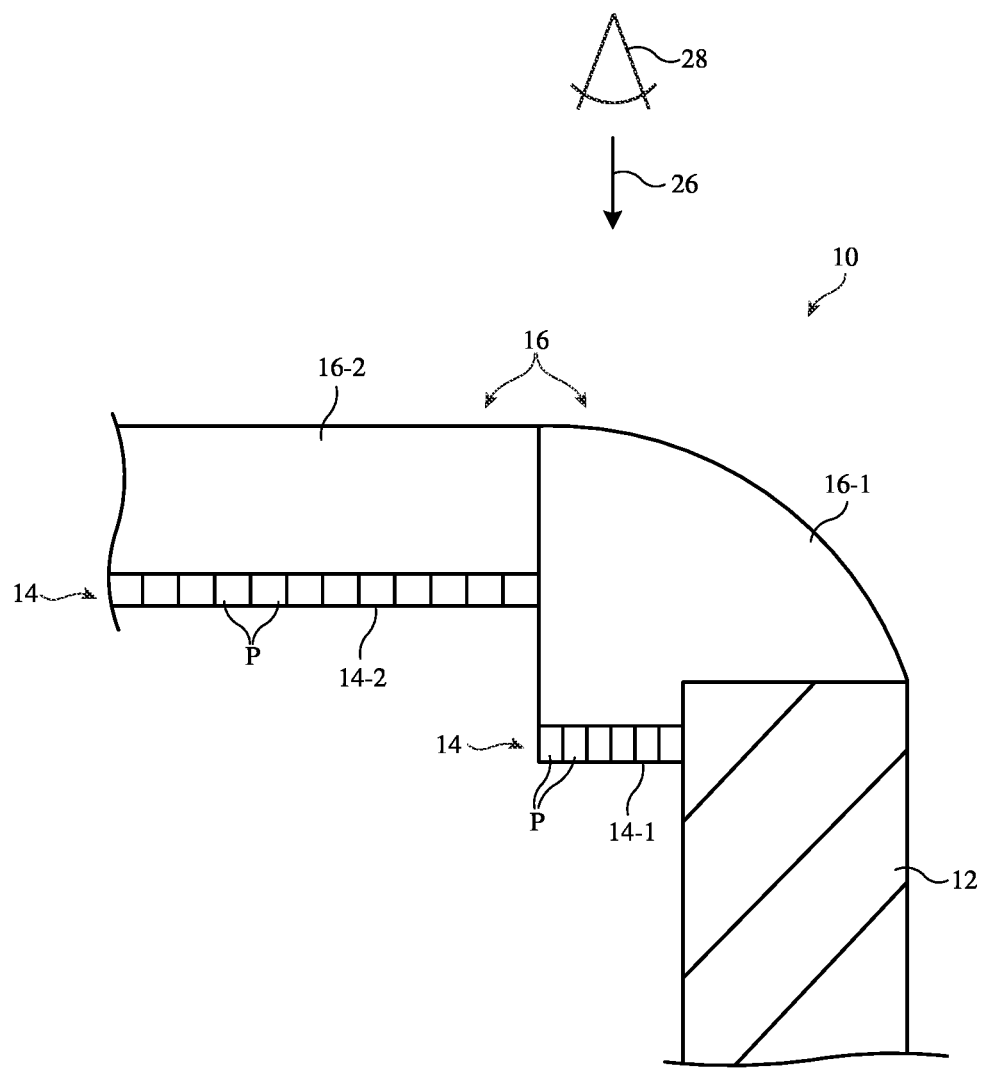
FIG. 16 is a cross-sectional side view of an illustrative electronic device with an image transport layer with a stepped inner surface in accordance with an embodiment.

In the example of FIG. 16, portion 16-1 and portion 16-2 have different thicknesses, resulting in a step height difference in the inner surfaces of portions 16-1 and 16-2. This step change in the thicknesses of portions 16-1 and 16-2 may be accommodated by providing display 14 with a border portion such as portion 14-1 that is attached to the inner surface of portion 16-1 and a central portion such as portion 14-2 that is attached to the inner surface of portion 16-2. Display portions 14-1 and 14-2 may, as an example, be formed from crystalline semiconductor light-emitting diode dies mounted on separate substrates.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
 a display configured to produce an image; and
 a coherent fiber bundle having opposing input and output surfaces and configured to receive the image at the input surface, wherein the coherent fiber bundle has a central portion, wherein the coherent fiber bundle has a border portion with bent fibers that surrounds the central portion and is attached to the central portion by adhesive, wherein the bent fibers are bent away from the central portion toward the output surface of the coherent fiber bundle, wherein the border portion comprises first fiber cores, first fiber cladding, and a first binder, wherein the central portion comprises second fiber cores, second fiber cladding, and a second binder, wherein at least one of: the first and second fiber cores, the first and second fiber cladding, and the first and second binders are formed from different materials, wherein the output surface at the central portion is planar, and wherein the output surface at the border portion has a curved cross-sectional profile.

2. The electronic device defined in claim 1 wherein the bent fibers each include at least two bends.

3. The electronic device defined in claim 2 wherein the central portion is free of bent fibers.

4. The electronic device defined in claim 1 wherein the coherent fiber bundle in the border portion comprises a ledge.

5. The electronic device defined in claim 4 further comprising a housing attached to the ledge.

6. The electronic device defined in claim 1 wherein the first fiber cores include a first fiber core material and wherein the second fiber cores include a second fiber core material that is different than the first fiber core material.

7. The electronic device defined in claim 1 wherein the first fiber cores have a first refractive index and wherein the second fiber cores have a second refractive index that is different than the first refractive index.

8. The electronic device defined in claim 7 wherein the first refractive index is higher than the second refractive index.

9. The electronic device defined in claim 1 wherein the display is planar.

10. The electronic device defined in claim 1 wherein the display has a bent portion and wherein the border portion has a corresponding curved input surface portion.

11. The electronic device defined in claim 1 wherein there is a thickness step between the border portion and the central portion and wherein the display has a first substrate coupled to the input surface of the border portion and has a separate second substrate coupled to the input surface of the central portion.

12. An electronic device, comprising:
 a display configured to produce an image; and
 a coherent fiber bundle overlapping the display, wherein the coherent fiber bundle has an input surface that receives the image and an output surface to which the image is provided through the coherent fiber bundle, the coherent fiber bundle having a border portion that includes first fibers in a first binder and having a central portion that is fused to the border portion and that includes second fibers in a second binder, wherein at least one material in the first fibers and the first binder differs from a corresponding material in the second fibers and the second binder, wherein the output surface at the central portion is planar, and wherein the output surface at the border portion has a curved cross-sectional profile.

13. The electronic device defined in claim 12 wherein the first fibers of the border portion have fiber cores of a first refractive index and wherein the second fibers of the central portion have fiber cores of a second refractive index that is different than the first refractive index.

14. The electronic device defined in claim 13 wherein the first refractive index is higher than the second refractive index.

15. The electronic device defined in claim 12 further comprising a housing attached to the border portion, wherein the border portion has bent fibers configured to conceal at least part of the housing from view.

16. The electronic device defined in claim 15 wherein the at least one material in the first fibers and the first binder that differs from the corresponding material in the second fibers and the second binder comprises fiber core material.

17. The electronic device defined in claim 12 wherein the first fibers comprise bent fibers that are bent away from the central portion toward the output surface of the coherent fiber bundle.

\* \* \* \* \*